(12) United States Patent
Guan et al.

(10) Patent No.: US 10,986,429 B2
(45) Date of Patent: Apr. 20, 2021

(54) ALL-IN-ONE CONVERTER USING A LOW-SPEED OPTICAL MODULE ON A HIGH-SPEED SWITCH

(71) Applicant: Linktel Technologies Co., Ltd, Wuhan (CN)

(72) Inventors: Helin Guan, Wuhan (CN); Tianshu Wu, Wuhan (CN); Xianwen Yang, Wuhan (CN); Linke Li, Wuhan (CN); Jian Zhang, Wuhan (CN); Kai Tang, Wuhan (CN)

(73) Assignee: LINKTEL TECHNOLOGIES CO., LTD, Wuhan (CN)

( * ) Notice: Subject to any disclaimer, the term of this patent is extended or adjusted under 35 U.S.C. 154(b) by 0 days.

(21) Appl. No.: 16/547,205

(22) Filed: Aug. 21, 2019

(65) Prior Publication Data

US 2020/0252701 A1    Aug. 6, 2020

(30) Foreign Application Priority Data

Jan. 31, 2019  (CN) .......................... 201910100248.8
Jun. 17, 2019  (CN) .......................... 201920907528.5

(51) Int. Cl.
*H04Q 11/00*   (2006.01)
*G02B 6/42*    (2006.01)

(52) U.S. Cl.
CPC ....... *H04Q 11/0071* (2013.01); *G02B 6/4284* (2013.01)

(58) Field of Classification Search
None
See application file for complete search history.

(56) References Cited

U.S. PATENT DOCUMENTS

| | | | | |
|---|---|---|---|---|
| 2007/0280695 | A1* | 12/2007 | Li | H04J 14/0282 398/135 |
| 2011/0293283 | A1* | 12/2011 | Dong | H04B 10/693 398/135 |
| 2016/0301996 | A1* | 10/2016 | Morris | H04Q 11/0003 |
| 2018/0156990 | A1* | 6/2018 | Chou | H04B 10/25891 |

* cited by examiner

*Primary Examiner* — David W Lambert
(74) *Attorney, Agent, or Firm* — Stephen J. Weyer, Esq.; Stites & Harbison, PLLC

(57) ABSTRACT

The present invention relates to an all-in-one converter using a low-speed optical module on a high-speed switch. The present invention relates to the field of optical modules in optical communications. It provides a solution of using a 25G optical module on a 100G switch, and simultaneously enabling a 10G optical module to be used on a 40G switch. A first electrical interface of the converter is connected with a 100G/40G switch, which meets the requirements of SFF-8636 protocol and realizes the bidirectional transmission of signals from the switch to the converter. A second electrical interface of the converter is connected with the optical module, which realizes the module's bidirectional transmission from the converter to the optical module. There is a signal conversion circuit inside the converter, which makes the signals of the two electrical interfaces meet the requirements of their respective protocols. An MCU is integrated inside the converter, which can read information of EEPROM inside the module, making the converter more user-friendly.

8 Claims, 5 Drawing Sheets

ALL-IN-ONE CONVERTER USING A LOW-SPEED OPTICAL MODULE ON A HIGH-SPEED SWITCH

CROSS-REFERENCE TO RELATED APPLICATIONS

This application claims priority to Chinese Patent Applications No. 201910100248.8, filed on Jan. 31, 2019 entitled "Switching Device And Circuit For QSFP28 To SFP28 Port Backward Compatible With QSFP+ To SFP+ Port", and No. 201920907528.5, filed on Jun. 17, 2019, entitled "All-In-One Converter Using A Low-Speed Optical Module On A High-Speed Switch" which are incorporated herein by reference in its entirety.

FIELD OF THE TECHNOLOGY

The present invention relates to the field of optical modules in optical communication. In particular, it relates to an all-in-one converter using a low-rate optical module on a high-speed switch.

DESCRIPTION OF THE RELATED ART

At present, the speed of common switches is 10G, 25G, 40G and 100G. However, due to the updating of communication equipment, 100G switches are becoming more and more commonly used. However, in the practical usage, a low-speed optical module cannot be directly used in a high-speed switch. A common transfer scheme is to use one to four AOC cable splitters to realize the transfer. However, in this situation, four low-speed optical modules are required, which is very inconvenient to use and takes up a lot of space.

SUMMARY OF THE INVENTION

The purpose of the present invention is to overcome the defects of the prior art, and provide an all-in-one converter using a low-speed optical module on a high-speed switch, using a 25G optical module on a 100G switch, and simultaneously enabling a 10G optical module to be used on a 40G switch, which is more convenient for operators.

The present invention is therefore realized as following: the invention discloses an all-in-one converter using a low-rate optical module on a high-rate switch, comprising: a first electrical interface J1 and a second electrical interface J2. The first electrical interface J1 is used to connect to a four-channel high-speed switch to realize bidirectional transmission of signals from the switch to the converter. The second electrical interface J2 is used to connect to a single-channel optical module to realize bidirectional transmission of signals from the converter to the optical module. One channel of the first electrical interface J1 connects to the second electrical interface J2 correspondingly and transmits signals as an effective signal channel, while the other channels of the first electrical interface J1 do not transmit signals.

An MCU module is disposed between the first electrical interface J1 and the second electrical interface J2, an SDA pin an SCL pin of first electrical interface J1 connect to the MCU module correspondingly. An SDA pin and an SCL pin of the second electrical interface J2 connect to the MCU module correspondingly. The MCU module realizes the conversion of I2C communication between the first electrical interface J1 and the second electrical interface J2. The MCU module is used to read and write information of EEPROM inside the optical module through the second electrical interface J2, which is used to identify a series of information, such as the type of converter, SN number, manufacturer, and read information of EEPROM in the MCU of the converter through the first electrical interface J1 and transmit the information to the switch.

A first input terminal of the MCU module is connected to an MODSELL pin of the first electrical interface J1, which is used to acquire an enable signal that allows I2C communication, and a second input terminal of the MCU module is connected to an Mod_ABS pin of the second electrical interface J2, which is used to determine whether the optical module has been inserted into the converter.

A signal conversion circuit is connected between the first electrical interface J1 and the second electrical interface J2, which is used to convert a reported signal, so that the signals of the first electrical interface J1 and the second electrical interface J2 meet requirements of their respective protocol.

MCU and I2C conversion circuit enables I2C signal transmission to meet their respective transmission standards. The circuit between the first electrical interface J1 and the second electrical interface J2 includes a high-speed signal line design, so that the converter can support a single signal transmission rate maximal at 28 GB/s.

The third input terminal of the MCU module is connected to a RESET pin of the first electrical interface J1 and is used to acquire a reset signal of the optical module; when the MCU received this signal, it initializes all the internal information to an original value.

The Mod-ABS pin of the second electrical interface J2 is connected to the MODPRSL pin of the first electrical interface J1, which is used for the switch to determine whether the optical module has been inserted.

The signal conversion circuit comprises a first conversion circuit, a second conversion circuit and a third conversion circuit. The input terminal of the first conversion circuit is connected to the RESET pin of the first electrical interface J1. The output terminal of the first conversion circuit is connected to the TX_DISABLE pin of the second electrical interface J2. Both input terminals of the second conversion circuit are connected to the LPMODE pin of the first electrical interface J1. Both output terminals of the second conversion circuit are connected to the RS0 pin and RS1 pin of the second electrical interface J2 respectively. Two input terminals of the third conversion circuit are connected to the TX_FAULT pin and RX_LOS pin of the second electrical interface J2 respectively. The output of the third conversion circuit is connected to the INTL pin of the first electrical interface J1.

Signal conversion circuit uses MOSFET as the carrier of signal conversion to convert digital diagnostics monitoring (DDM) related signals. There are two Gold Finger regions at the first electrical interface and second electrical interface. The signal conversion between the circuit of first electrical interface and second electrical interface can meet the requirements of their respective multi-source protocols.

The first conversion circuit comprises an MOSFET Q7. The gate of the MOSFET Q7 is connected to the one end of the resistance R17 and an RESET pin of the first electrical interface J1. The drain of the MOSFET Q7 is connected to the one end of the resistance R18, and a TX_DISABLE pin of second electrical interface J2. The other end of the resistance R17 and the other end of the resistance R18 are connected to 3.3V voltage and one end of a capacitor C6. The other end of the capacitor C6 is connected to ground. The source of the MOSFET Q7 is connected to ground.

The second conversion circuit comprises an MOSFET Q8. The gate of MOSFET Q8 is connected to one end of a resistance R19 and an LPMODE pin of the first electrical interface J1. The drain of MOSFET Q8 is connected to one end of a resistance R20 and a RS0 pin of the second electrical interface J2. The other end of the resistance R19 and the other end of the resistance R20 are connected to 3.3V voltage and one end of a capacitor C7. The other end of the capacitor C7 is connected to ground. The source of the MOSFET Q8 is connected to ground.

The second conversion circuit also comprises an MOSFET Q9. The gate of MOSFET Q9 is connected to an LPMODE pin of the first electrical interface J1. The drain of MOSFET Q9 is connected to one end of a resistance R16 and a RS1 pin of the second electrical interface J2. The other end of the resistance R16 is connected to 3.3V voltage and one end of a capacitor C8. The other end of the capacitor C8 is connected to ground. The source of the MOSFET Q9 is connected to ground.

The third conversion circuit comprises an MOSFET Q6 and an MOSFET Q10. The gate of the MOSFET Q6 is connected to the one end of a resistance R13 and a TX_FAULT pin of the second electrical interface J2 respectively. The gate of the MOSFET Q10 is connected to one end of a resistance R15 and a RX_LOS pin of the second electrical interface J2 respectively. The drain of the MOSFET Q6 and the drain of the MOSFET Q10 are connected to the one end of the resistance R14 and an INTL pin of the first electrical interface J1. The other end of the resistance R13, the other end of the resistance R14 and the other end of the resistor R15 are connected with 3.3V voltage and the other end of a capacitor C5. The other end of the capacitor C5 is connected to ground. The source of MOSFET Q6 and the source of the MOSFET Q10 are connected to ground.

By defining contents of high 128 bytes of PAGE00 of EEPROM in the converter MCU, this area of the converter has higher priority than the same area of the optical module. By reading information of the EEPROM inside the converter, the contents of high 128 bytes of PAGE00 can be read, no matter whether the converter has been inserted into the optical module or not. So that it can identify a series of information, such as the type of converter, SN number and manufacturer. When the converter is working normally with one end of the converter connected to the optical module and the other end connects to the switch, the MCU of the converter downloads the information from other areas of the optical module to the local area, and reads information of other areas of the module from the switch normally. When the optical module is pulled out, the information of these areas is cleared completely.

The MCU module uses a chip of model EFM8LB. The $24^{th}$ pin of the MCU module connects to one end of a resistance R7 and the SDA pin of the first electrical interface J1. The other end of resistance R7 is connected to 3.3V voltage. The $23^{rd}$ pin of the MCU module is connected to one end of a resistance R10 and an SCL pin of the first electrical interface J1. The other end of resistance R10 is connected to 3.3V voltage. The $16^{th}$ pin of the MCU module is connected to one end of a resistance R22 and an SDA pin of the second electrical interface J2. The other end of resistance R22 is connected to 3.3V voltage. The $13^{th}$ pin of the MCU module is connected to one end of the resistance R23 and an SCL pin of the second electrical interface J2. The other end of resistance R23 is connected to 3.3V voltage. The $22^{nd}$ pin of the MCU module is connected to one end of the resistance R11 and the MODSELL pin of the first electrical interface J1. The other end of resistance R11 is connected to 3.3V voltage. The $18^{th}$ pin of the MCU module is connected to one end of the resistance R21 and the Mod_ABS pin of the second electrical interface J2. The other end of resistance R21 is connected to 3.3V voltage. The $5^{th}$ pin of the MCU module is connected to the RESET pin of the first electrical interface J1.

The VDD pin of the MCU module is connected to 3.3V voltage and one end of a capacitor C4. The other end of the capacitor C4 is connected to ground. The GND pin of MCU module is connected to ground.

The invention also discloses an all-in-one converter using a low-rate optical module on a high-rate switch, comprising an unlocking device, a base and an upper cover. The base and the upper cover are fixedly connected to form a housing. The electronic device is fixed between the base and the upper cover. The tail portion of the upper cover is clamped with a locking sheet metal part for locking the optical module inserted into the converter. An outer wall of the housing is disposed with a sliding groove for sliding to fit with the unlocking device. The unlocking device fits and is limited in a sliding groove on the outer wall of the housing. A side wall of the unlocking device is disposed with an unlocking portion for detaching a corresponding cage spring plate from the converter. A spring is mounted on the base to provide resetting force for the unlocking device.

The unlocking device comprises an unlocking seat and a pull belt or a pull ring connected to the unlocking seat. The unlocking seat comprises two parallel side plates and a bottom plate fixed between two parallel side plates. The left and right side plates of the unlocking seat are disposed with an upward protrusion extending upwardly and a downward protrusion extending downwardly. The base is disposed with a limiting groove corresponding to the downward protrusion of the left and right side plates of the unlocking device, and the upper cover is disposed with a limiting groove corresponding to the upward protrusion of the left and right side plates of the unlocking device. The downward protrusion of the left and right side plates of the unlocking device extends into the corresponding limiting groove of the base. The upward protrusion of the left and right side plates of the unlocking seat extends into the corresponding limiting groove of the upper cover, which makes the unlocking seat have certain degree of freedom under the drive of pull belt or pull ring. The ends of left and right side plate of the unlocking seat are disposed with an outward bending portion, forming the unlocking part to detach a corresponding cage spring plate from the converter. The lower end of the base is provided with a spring mounting groove. A spring is placed in the spring mounting groove. A bottom plate of the unlocking seat is located below the spring mounting groove to support the spring. The bottom plate of the unlocking seat is disposed with an upward extending spring baffle. The spring baffle on the bottom plate of the unlocking seat extends into the spring mounting groove at the bottom of the base, contacting one end of the spring in the spring mounting groove, so that the spring provides the resetting force to the unlock device.

The cross section of the locking sheet metal is U-shaped. The left outer wall and the right outer wall of the tail portion of the upper cover are disposed with a clamping convex plate. The left and right side walls of the locking sheet metal part are disposed with a bayonet for matching with the clamping convex plate at the tail portion of the upper cover.

The base and the end of the upper cover are clamped. The base and the head of the upper cover are fixed by bolts. The base and the head of the upper cover are respectively provided with corresponding bolt mounting holes.

The electronic device has the first electrical interface J1 (Gold Finger region), the second electrical interface J2 (Gold Finger region), MCU model, and signal conversion circuit. The electronic device includes a PCB board and a connector for plugging in the optical module. The PCB board is electrically connected to the connector. PCB board includes gold finger region, MCU module, and signal conversion circuit.

Connectors are specially designed. The height of them is lower than the standard size so as to accommodate the limited space within the converter. There is a metal sheet on the upper surface of each of the connectors, which can reduce the crosstalk of signals.

Compared with the prior art, the invention has the following beneficial effects:

In order to solve the problem of inconvenient conversion, the present invention designs a device to use a 25G optical module on the port of a 100G switch directly, and simultaneously satisfies a lower speed optical module. Since the 100G/40G module has four channels, the first channel is selected as the effective signal channel. The other channels do not transmit signals, and the module transmits signals to achieve the transfer function to realize bidirectional conversion of the four-channel high-speed switch to the single-channel optical module. An MCU is integrated inside the device, which can read and write the information of the EEPROM inside the optical module. By defining the contents of the EEPROM and the high 128 bytes of the PAGE00 in the converter's MCU, this area of the converter has higher priority than the same area of optical module. By this design, address conflicts between the converter and the module can be avoided. By reading the information of the EEPROM inside the converter, the contents of the high 128 bytes of the PAGE00 can always be read, no matter whether the converter has been inserted into the optical module or not. So that it can identify a series of information, such as the type of converter, SN number and manufacturer. When the converter is working normally with one end connected to the 10G/25G optical module and the other end connected to the switch, the MCU of the converter can download the information from other areas of the optical module to the local area, so as to read the information of other areas of the module from the switch normally. When the optical module is pulled out, the information of these areas will be cleared completely, so as to prevent operator's misjudgment. These designs are more convenient for the operator.

Figure 1:
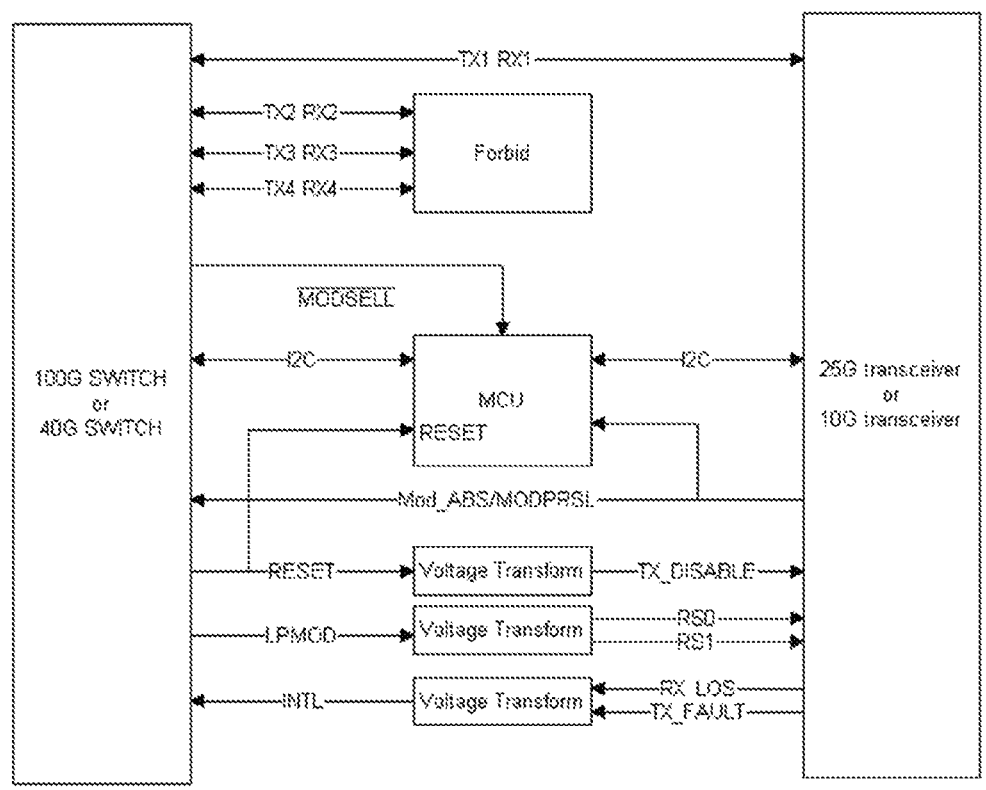
FIG. 1 is a functional block diagram of the converter of the present invention.
Figure 2:
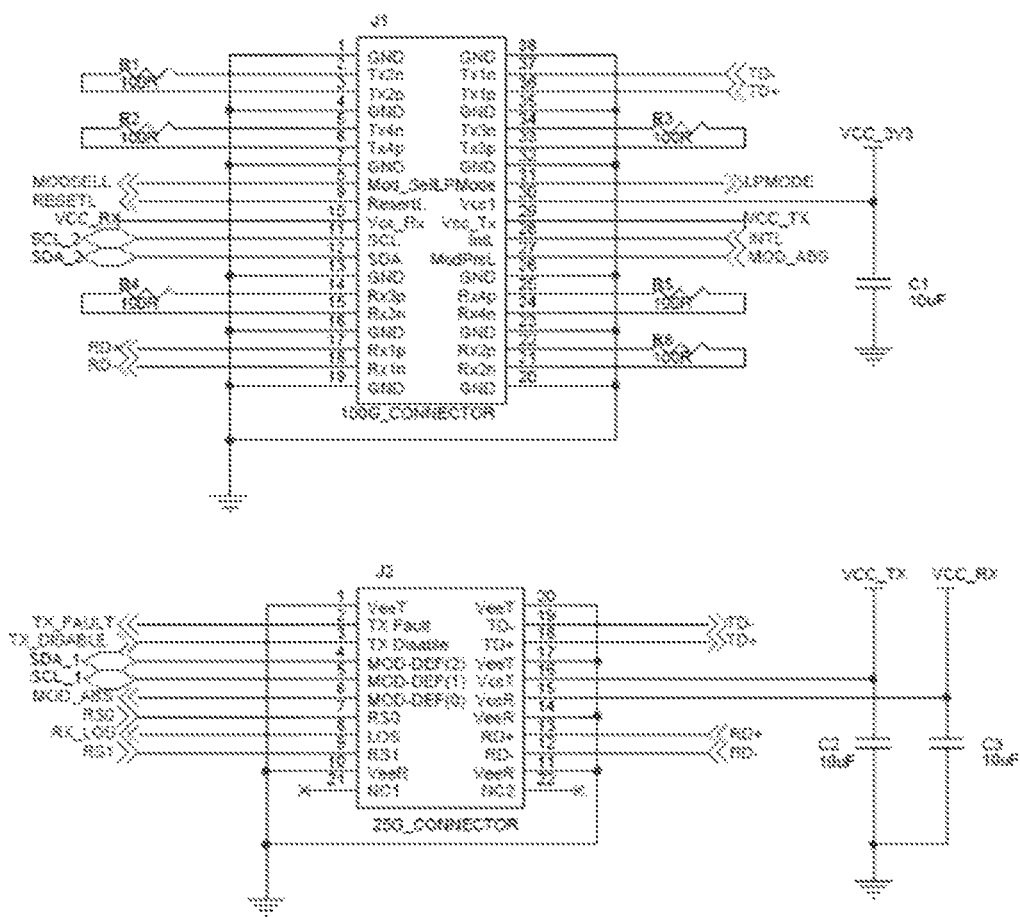
FIG. 2 is a circuit diagram of the gold finger portion (first electrical interface J1, second electrical interface J2) of the converter of the present invention.
Figure 3:
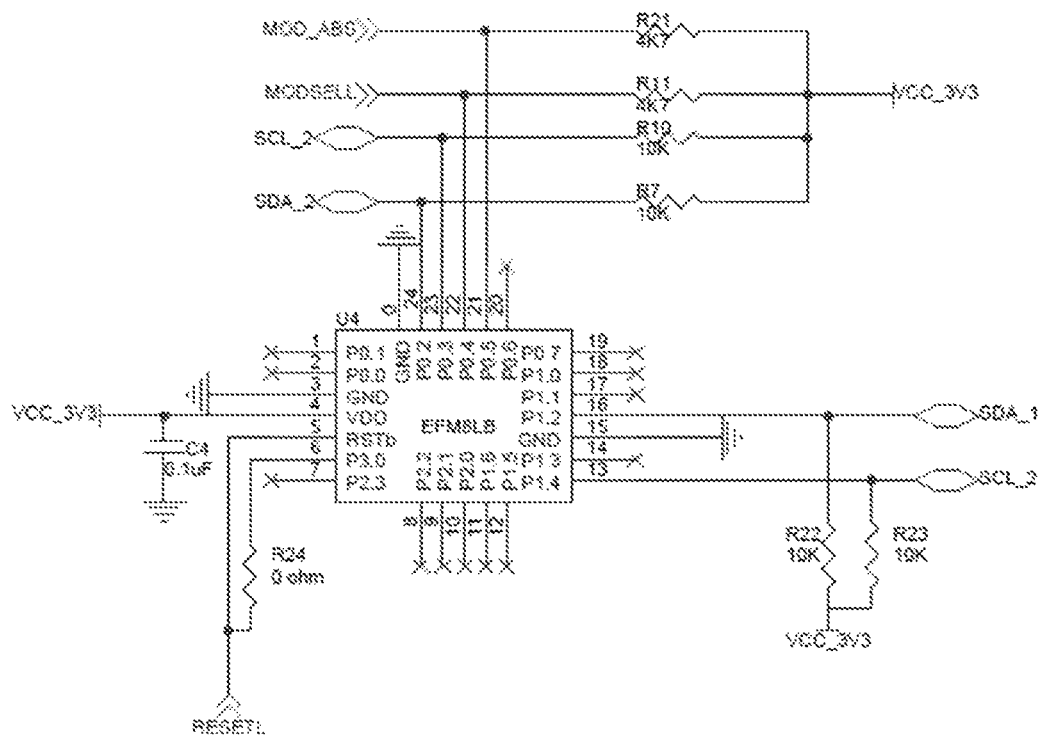
FIG. 3 is a circuit diagram of the communication implementation of the converter MCU and the I2C.
Figure 4:
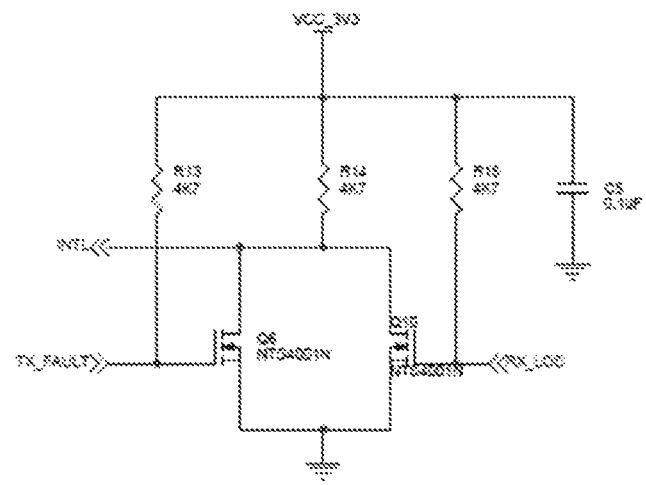
FIG. 4 is a circuit diagram of other report implementation circuits.
Figure 4:
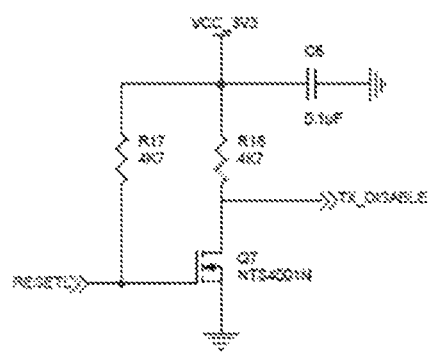
Figure 4:
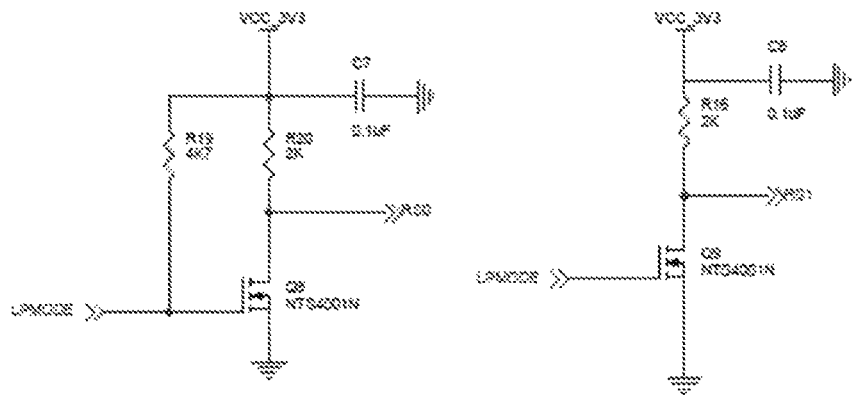

Reference Numerals: 1 Base, 11 Spring mounting groove, 12 Limit groove of the base, 2 Upper cover, 21 Clamping convex plate, 22 Limit groove of the upper cover, 3 Locking sheet metal part, 31 Bayonet, 32 Spring plate, 4 Unlocking device, 41 Upward protrusion, 42 Downward protrusion, 43 Unlocking portion, 44 Spring baffle, 45 Pull belt, 5 Spring, 6 PCB board, 7 Connector, 8 Optical module, 9 Screw

DESCRIPTION OF EMBODIMENTS

The technical solutions in the embodiments of the present invention are clearly and completely described in the following with reference to the accompanying drawings in the embodiments of the present invention. It is apparent that the described embodiments are only a part of the embodiments of the invention, but not all of the embodiments. All other embodiments obtained by those of ordinary skill in the art based on the embodiments of the present invention without creative efforts are within the scope of the present invention.

Referring FIG. 1 to FIG. 4, the present invention discloses an all-in-one converter using a low-speed optical module on a high-speed switch, which comprises a first electrical interface J1, a second electrical interface J2. The first electrical interface J1 is used to connect with a four channel high speed switch, such as a 100G or 40G switch, to realize the bidirectional transmission of signals from the switch to the converter. The second electrical interface J2 is used to connect with a single-channel optical module, such as a 25G or 10G optical module, to realize the bidirectional transmission of signals from the converter to the optical module. The first electrical interface J1 and the second electrical interface J2 transmit signals through one of the channels as an effective signal channel, while the other channels do not transmit signals. The rest of the channels in this embodiment are connected to 100 ohm resistances so that those channels are not in use. The remaining control and indication signals are connected normally. The definition of gold finger complies with MSA multi-source protocol.

There is an MCU module disposed between the first electrical interface J1 and the second electrical interface J2. The SDA pin and the SCL pin of first electrical interface J1 are connected to the MCU module correspondingly. The SDA pin and the SCL pin of the second electrical interface J2 are connected to the MCU module correspondingly. The MCU module realizes the conversion of I2C communication between the first electrical interface J1 and the second electrical interface J2. The MCU module is used to read and write information of EEPROM inside the optical module through the second electrical interface J2, which is used to identify a series of information, such as type of the converter, SN number, manufacturer, and read information of EEPROM in the MCU of the converter through the first electrical interface J1 and transmit the information to the switch.

The second input terminal of the MCU module is connected to the Mod_ABS pin of the second electrical interface J2. The Mod-ABS pin of the second electrical interface J2 is connected to an MODPRSL pin of the first electrical interface J1. That is, one branch of Mod-ABS is connected to MCU to determine whether the 25G module has been inserted into this switch. Another branch of Mod-ABS is connected to the MODPRSL of gold fingers on the 100G switch, for the switch to determine whether the optical module has been inserted or not. The EEPROM of MCU stores the contents of high 128 bytes of PAGE00 defined by a user. The information of PAGE00 can be read, no matter whether the SFP module has been inserted or not. When a SFP28 module is inserted, the information of other areas of the module can be read. When the SFP28 module is pull out, those areas will be set to FF or 00.

The first input terminal of the MCU module is connected to the MODSELL pin of the first electrical interface J1, which is used to acquire an enable signal that allows I2C communication. The MODSELL pin is a low enable signal pin. The communication of I2C is allowed only when the MODSELL is low.

The third input terminal of the MCU module is connected to a RESET pin of the first electrical interface J1, to acquire a reset signal of the optical module, and initialize the information in the MCU according to the optical module reset signal. One branch of the RESET pin of the QSFP28 is connected to the RESET pin of the MCU. When the optical module needs to be reset, the MCU related information will also be reset, so as to make the MCU information and the optical module information consistent.

There is a signal conversion circuit connected between the first electrical interface J1 and the second electrical interface J2, which is used to realize conversion of a reported signal, so that signals of the first electrical interface J1 and the second electrical interface J2 meet requirements of their respective protocol.

Since the definition of reported information of 100G/40G optical module is different with the 25G/10G optical module, a MOSFET is needed for logic conversion.

The signal conversion circuit comprises a first conversion circuit, a second conversion circuit and a third conversion circuit. The input terminal of the first conversion circuit is connected to the RESET pin of the first electrical interface J1. The output terminal of the first conversion circuit is connected to the TX_DISABLE pin of the second electrical interface J2. Two input terminals of the second conversion circuit are both connected to the LPMODE pin of the first electrical interface J1. Two output terminals of the second conversion circuit is respectively connected to the RS0 pin and the RS1 pin of the second electrical interface J2. Two input terminals of the third conversion circuit is respectively connected to the TX_FAULT pin and RX_LOS pin of the second electrical interface J2. The output terminal of the third conversion circuit is connected to the INTL pin of the first electrical interface J1.

The main component used in the signal conversion circuit is an MOSFET, whose main function is that it has three electrodes: source S, drain D, and gate G. It is a voltage control device that uses the gate voltage to control the drain-source current for level shifting. DDM related report of the optical module is directed out through each PIN pin of the chip.

The first conversion circuit comprises a MOSFET Q7. The gate of the MOSFET Q7 is connected to one end of a resistance R17 and the RESET pin of the first electrical interface J1. The drain of the MOSFET Q7 is connected to one end of a resistance R18 and the TX_DISABLE pin of second electrical interface J2. The other end of the resistance R17 and the other end of the resistance R18 are connected to 3.3V voltage and one end of a capacitor C6. The other end of the capacitor C6 is connected to ground. The source of the MOSFET Q7 is connected to ground. This circuit is used to convert a reset signal. The RESETL signal is converted to a TX_DISABLE signal via a NOT gate.

The second conversion circuit comprises a MOSFET Q8. The gate of MOSFET Q8 is connected to one end of a resistance R19 and the LPMODE pin of the first electrical interface J1. The drain of MOSFET Q8 is connected to one end of a resistance R20 and the RS0 pin of the second electrical interface J2. The other end of the resistance R19 and the other end of the resistance R20 are connected to 3.3V voltage and one end of a capacitor C7. The other end of the capacitor C7 is connected to ground. The source of the MOSFET Q8 is connected to ground. This circuit is used convert a speed selection signal.

The LPMODE signal is converted to the RS0 signal via a NOT gate, and no level shifting is required when converting to the RS1 signal. A MOSFET is used in order to maintain the uniformity of the delay. This completes the conversion of the speed selection signal.

The second conversion circuit comprises a MOSFET Q9. The gate of MOSFET Q9 is connected to the LPMODE pin of the first electrical interface J1. The drain of MOSFET Q9 is connected to one end of a resistance R16 and the RS1 pin of the second electrical interface J2. The other end of the resistance R16 is connected to 3.3V voltage and one end of a capacitor C8. The other end of the capacitor C8 is connected to ground. The source of the MOSFET Q9 is connected to ground.

The third conversion circuit comprises an MOSFET Q6 and an MOSFET Q10. The gate of the MOSFET Q6 is connected to one end of a resistance R13 and the TX_FAULT pin of the second electrical interface J2 respectively. The gate of the MOSFET Q10 is connected to one end of a resistance R15 and the RX_LOS pin of the second electrical interface J2 respectively. The drain of the MOSFET Q6 and the drain of the MOSFET Q10 are connected to one end of a resistance R14 and the INTL pin of the first electrical interface J1. The other end of the resistance R13, the other end of the resistance R14 and the other end of the resistor R15 are connected to 3.3V voltage and one end of a capacitor C5. The other end of the capacitor C5 is connected to ground. The source of the MOSFET Q6 and the source of the MOSFET Q10 are connected to ground.

When anyone of the TX_FAULT and the RX_LOS is high level, the INTL signal is set to high. It is used to convert an interrupt signal, equivalent to a NOR gate.

| Input | | Output |
|---|---|---|
| TX_FAULT | RX_LOS | INTL |
| 1 | 1 | 1 |
| 1 | 0 | 1 |
| 0 | 1 | 1 |
| 0 | 0 | 0 |

According to SFP+ or SFP28 A0H byte 110's $1^{st}$ bit and $2^{nd}$ bit, it can be identified which one leads to the emergence of QSFP28/QSFP+ INTL.

The Contents of SFF8472 Protocol at Byte 110's $1^{st}$ and $2^{nd}$ Bits in Address A0H Area

| Address | Bit | Contents |
|---|---|---|
| A0H 110 | 2 | The flag of the TX_Fault output pin. The level changes in 100 milliseconds when the pin changes. |
| | 1 | The flag of the RX_LOS output pin. The level changes in 100 milliseconds when the pin changes. |

By defining contents of high 128 bytes of PAGE00 of EEPROM in the converter MCU, this area of the converter has higher priority than the same area of the optical module. By reading information of the EEPROM inside the converter, the contents of the high 128 bytes of the PAGE00 can always be read, no matter whether the converter has been inserted into the optical module or not, so that it can identify a series of information, such as type of the converter, SN number and manufacturer. When the converter is working normally with one end of the converter connected to the optical module and the other end connected to the switch, the MCU of the converter downloads information of other areas of the optical module to local area, and reads information of other areas of the module from the switch normally. When the optical module is pulled out, the information of these areas is cleared completely.

The MCU module uses a chip of model EFM8LB; the $24^{th}$ pin of the MCU module is connected to one end of a resistance R7 and the SDA pin of the first electrical interface J1. The other end of the resistance R7 is connected to 3.3V voltage. The $23^{rd}$ pin of the MCU module is connected to one end of a resistance R10 and an SCL pin of the first electrical interface J1. The other end of the resistance R10 is connected to 3.3V voltage. The $16^{th}$ pin of the MCU module is connected to one end of a resistance R22 and an SDA pin of the second electrical interface J2. The other end of the resistance R22 is connected to 3.3V voltage. The $13^{th}$ pin of the MCU module is connected to one end of a resistance R23 and an SCL pin of the second electrical interface J2. The other end of the resistance R23 is connected to 3.3V voltage. The $22^{nd}$ pin of the MCU module is connected to one end of the resistance R11 and the MODSELL pin of the first electrical interface J1. The other end of the resistance R11 is connected to 3.3V voltage. The $18^{th}$ pin of the MCU module is connected to one end of the resistance R21 and the Mod_ABS pin of the second electrical interface J2. The other end of resistance R21 is connected to 3.3V voltage. The $5^{th}$ pin of the MCU module is connected to the RESET pin of the first electrical interface J1 and one end of the resistance R24. The other end of resistance R24 is connected to the $6^{th}$ pin of the MCU module. In this embodiment, the resistance R24 uses a 0 ohm resistance.

The VDD pin of the MCU module is connected to 3.3V voltage and one end of a capacitor C4. The other end of the capacitor C4 is connected to ground. The GND pin of the MCU module is connected to ground.

The present invention provides a solution of using a 25G optical module on a 100G switch, and simultaneously enabling a 10G optical module to be used on a 40G switch. By the configuration of a high-speed differential line and the use of Ni/Au plating SFP sockets, the requirements of high-speed signal transmission can be satisfied, let alone for low-speed signal transmission. The first electrical interface of the converter is connected to a 100G/40G switch, which meets the requirements of SFF-8636 protocol and realizes the bidirectional transmission of signals from the switch to the converter. The second electrical interface of the converter is connected to an optical module, which realizes the module's bidirectional transmission from the converter to the optical module, and also realizes bidirectional conversion of signals from a high-rate switch to a low-rate optical module and from a low-rate optical module to a high-speed switch. There is a unique signal conversion circuit inside the converter, through the signal conversion circuit, making the signals of the two electrical interfaces both meet the requirements of their respective protocols. An MCU is integrated inside the converter, which can read information of EEPROM inside the module, making the converter more user-friendly.

Figure 5:
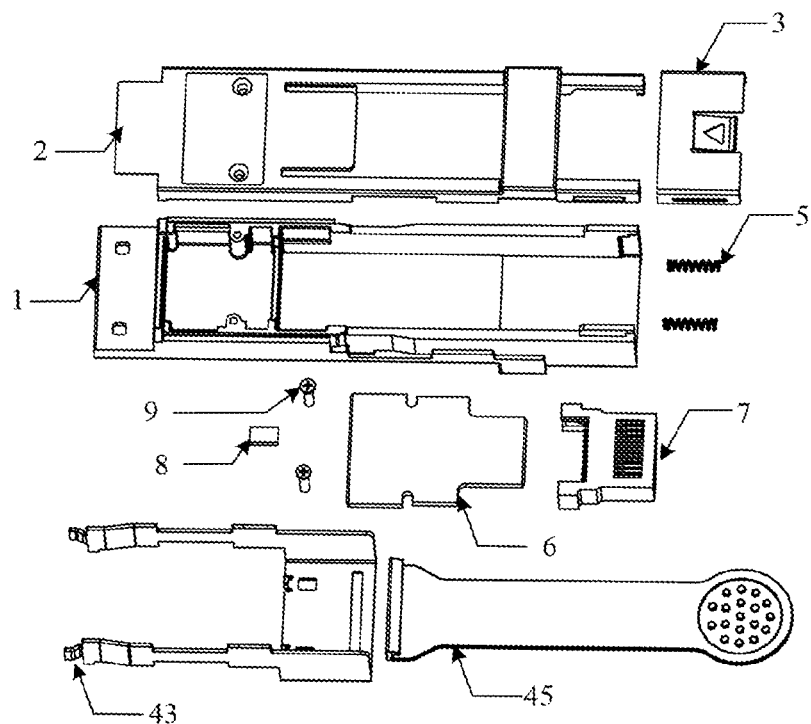
FIG. 5 is a drawing of the parts of the converter of the present invention.
Figure 6:
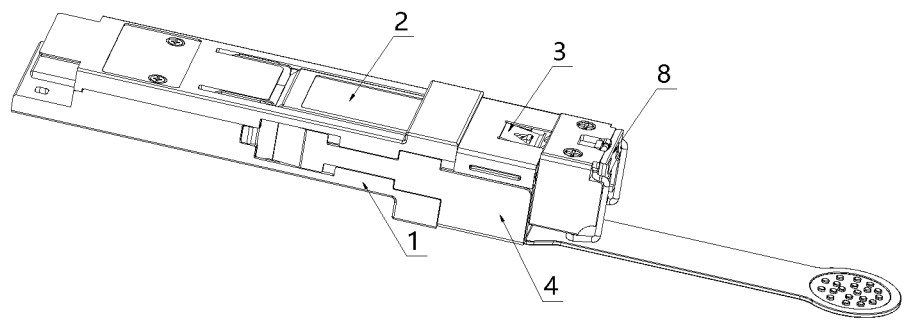
FIG. 6 is an assembly drawing of the converter of the present invention.
Figure 7:
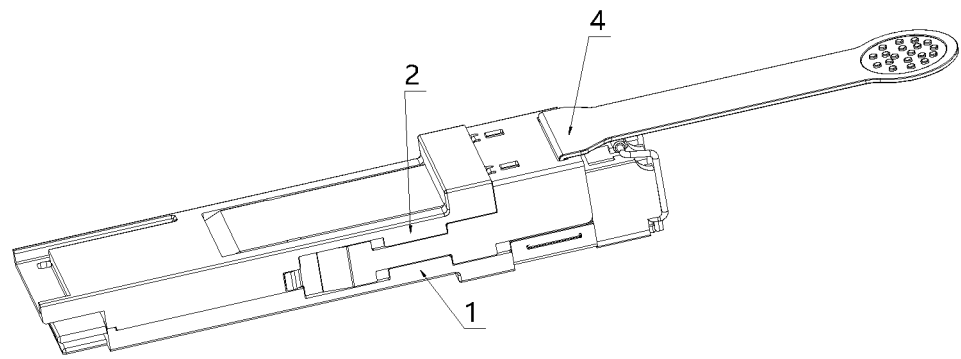
FIG. 7 is the top view of FIG. 6.

Referring to FIG. 5 to FIG. 7, this embodiment also discloses an all-in-one converter with a low-speed optical module used on a high-speed switch, comprising an unlocking device, a base 1 and an upper cover 2. The base and the upper cover are fixedly connected to form a housing. An electronic device is fixed between the base and the upper cover. The tail portion of the upper cover is clamped with a locking sheet metal part 3 for locking the optical module inserted into the converter. The outer wall of the housing is disposed with a sliding groove for sliding to fit with the unlocking device. The unlocking device sliding fits and is limited in the sliding groove disposed on the outer wall of the housing. The side wall of the unlocking device 4 is disposed with an unlocking portion for detaching a corresponding cage spring plate from the converter. A spring is mounted on the base to provide resetting force for the unlocking device.

The unlocking device comprises an unlocking seat and a pull belt or a pull ring connected to the unlocking seat. The unlocking seat comprises two parallel side plates and a bottom plate fixed between two parallel side plates. The left and right side plates of the unlocking seat are disposed with upward protrusions 41 extending upwardly and downward protrusions 42 extending downwardly. The base is disposed with limit grooves 12 corresponding to the downward protrusions of the left and right side plates of the unlocking device. The upper cover is disposed with limit grooves 22 corresponding to the upward protrusions of the left and right side plates of the unlocking device. The downward protrusion of the left and right side plates of the unlocking device extends into the corresponding limit grooves of the base. The upward protrusion of the left and right side plates of the unlocking seat extends into the corresponding limit grooves of the upper cover, which makes the unlocking seat have a certain degree of freedom under the drive of the pull belt or the pull ring. The ends of the left and right side plates of the unlocking seat are disposed with outward bending portions, forming an unlocking portion 43 to detach corresponding cage spring plates from the converter. The lower end of the base is disposed with spring mounting grooves. Springs are disposed in the spring mounting grooves 11. A bottom plate of the unlocking seat is located below the spring mounting grooves to support the springs. The bottom plate of the unlocking seat is disposed with upward extending spring baffles 44. The spring baffles on the bottom plate of the unlocking seat extend into the spring mounting grooves at the bottom of the base, contacting one end of the springs 5 in the spring mounting grooves, so that the springs provide the resetting force for the unlock device.

In the present embodiment, the pull belt 45 is fixedly connected to the base plate of the unlocking seat. The base plate of the unlocking seat is disposed with an mounting hole for installing the pull belt. There is a U-shaped groove at the bottom of the pull belt. By inserting the pull belt from the bottom mounting hole, the U-shaped groove will occlude with the cross beam at the edge of the bottom plate to complete the fixing. The base is disposed with a groove for mounting the pull belt to the expected position.

The cross section of the locking sheet metal part 3 is U-shaped. The left outer wall and the right outer wall of the tail portion of the upper cover are disposed with clamping convex plates 21. The left and right side walls of the locking sheet metal part are disposed with bayonets 31 for matching with the clamping convex plates at the tail portion of the upper cover. The locking sheet metal part is disposed with a spring plate 32. There is also a bayonet on the spring plate, to fit with the bump of optical module inserted into the converter, so that the optical module can be locked firmly with the converter.

The base is clamped to the tail portion of the upper cover. The base and the head portion of the upper cover are fixed by screws 9. The head portions of the base and the upper cover are respectively disposed with a corresponding installation hole.

The electronic device has the first electrical interface J1 (gold finger region), the second electrical interface J2 (gold finger region), the MCU model, and the signal conversion circuit. The electronic device includes a PCB board and a connector 7 for plugging in the optical module. The PCB board 6 is electrically connected to the connector. The PCB board includes gold finger region, the MCU module, and the signal conversion circuit. The present invention uses a flat connector to reduce the loss of electrical signals during conversion and also save the space inside the converter. The high-speed line uses differential wiring to reduce the loss of signals on a transmission line.

The base and upper cover can be made of zinc alloy material. The locking sheet metal part can be made of stainless steel.

During the specific implementation process, when the converter is connected to the external optical module 8, after the external optical module is inserted into the converter, the spring plate of locking sheet metal part at the tail portion of the converter automatically locks the external optical module through the unlocking part. When unlocking, rotate the pull ring of the optical module by 90°, and push the unlock button (with springs held). The unlock button has a bevel angle. By slowly pushing up the lock of locking sheet metal part on the converter, the spring plate of locking sheet metal part is released automatically to realize the unlocking function.

In order to connect the converter and the switch's interface, when the converter is inserted into the switch (corresponding cage), the spring plate of the cage clamps into the converter and locks firmly. During unlocking, pull the pull belt of the unlocking device of the converter to release the spring plate of the cage from the converter to realize unlocking function.

The first electrical interface is usually a Quad Small Form-factor Pluggable 28 Gbps (QSFP28) interface and simultaneously satisfies a Quad Small Form-factor Pluggable (QSFP+) interface. The second electrical interface is usually a Small Form Factor Pluggable 28 Gbps (SFP28) interface and simultaneously satisfies a 10 Gigabit Small Form Factor Pluggable (SFP+) interface.

Finally, it should be understood that the above embodiments are only preferred the embodiments, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

The invention claimed is:

1. An all-in-one converter with an optical module used on a switch, comprising a first electrical interface (J1) and a second electrical interface (J2); wherein,
   the first electrical interface (J1) is used to be connected to a four-channel switch so as to realize bidirectional transmission of signals from the switch to the converter; the second electrical interface (J2) is used to be connected to a single-channel optical module so as to realize bidirectional transmission of signals from the converter to the optical module;
   an MCU (Microcontroller Unit) module is disposed between the first electrical interface (J1) and the second electrical interface (J2); an SDA (Synchronous Data Adapter) pin and an SCL (Serial Communication Loop) pin of first electrical interface (J1) are connected to the MCU module correspondingly; an SDA pin and an SCL pin of the second electrical interface (J2) are connected to the MCU module correspondingly; the MCU module realizes conversion of I2C (Inter-Integrated Circuit) communication between the first electrical interface (J1) and the second electrical interface (J2); the MCU module is used to read and write information of EEPROM (Electronically Erasable Programmable Read-Only Memory) inside the optical module through the second electrical interface (J2), which is used to identify a series of information, including converter type, SN (Serial Number) number, manufacturer, and read information of EEPROM in the MCU of the converter through the first electrical interface (J1) and transmit the information to the switch;
   a first input terminal of the MCU module is connected to an MODSEIL pin of the first electrical interface (J1), which is used to acquire an enable signal that allows I2C-communication; a second input terminal of the MCU module is connected to an Mod_ABS pin of the second electrical interface (J2), which is used to determine whether the optical module has been inserted into the converter; and
   a signal conversion circuit is connected between the first electrical interface (J1) and the second electrical interface (J2), which is used to realize conversion of a reported signal.

2. The converter according to claim 1, wherein a third input terminal of the MCU module is connected to a RESET pin of the first electrical interface (J1) and is used to acquire a reset signal of the optical module; when the MCU receives this signal, it initializes all internal information to be an original value.

3. The converter according to claim 1, wherein the Mod-ABS pin of the second electrical interface (J2) is connected to an MODPRSL pin of the first electrical interface (J1), which is used for the switch to determine whether the optical module has been inserted.

4. The converter according to claim 1, wherein the signal conversion circuit comprises a first conversion circuit; the first conversion circuit comprises a MOSFET (Metallic Oxide Semiconductor Field Effect Transistor) (Q7); the gate of the MOSFET (Q7) is connected to the one pin of a resistor (R17) and an RESET pin of the first electrical interface (J1); the drain of the MOSFET (Q7) is connected to one pin of a resistor (R18) and a TX_DISABLE pin of the second electrical interface (J2); the other pin of the resistor (R17) and the other pin of the resistor (R18) are connected to 3.3V voltage and one pin of a capacitor (C6); the other pin of the capacitor (C6) is connected to ground; the source of the MOSFET (Q7) is connected to ground.

5. The converter according to claim 1, wherein the signal conversion circuit comprises a second conversion circuit; the second conversion circuit comprises a MOSFET (Q8); the gate of MOSFET (Q8) is connected to one pin of a resistor (R19) and an LPMODE (Low Power Mode) pin of the first electrical interface (J1); the drain of MOSFET (Q8) is connected to one pin of a resistor (R20) and a RS0 (Rate Select bit0) pin of the second electrical interface (J2); the other pin of the resistor (R19) and the other pin of the resistor (R20) are connected to 3.3V voltage and one pin of a capacitor (C7); the other pin of the capacitor (C7) is connected to ground; the source of the MOSFET (Q8) is connected to ground; and the second conversion circuit further comprises a MOSFET (Q9); the gate of MOSFET (Q9) is connected to the LPMODE pin of the first electrical interface (J1); the drain of MOSFET (Q9) is connected to one pin of a resistor (R16) and a RS1 (Rate Select Bit1) pin of the second electrical interface (J2); the other pin of the resistor (R16) is connected to 3.3V voltage and one pin of a capacitor (C8); the other pin of the capacitor (C8) is connected to ground; the source of the MOSFET (Q9) is connected to ground.

6. The converter according to claim 1, wherein the signal conversion circuit comprises a third conversion circuit; the third conversion circuit comprises a MOSFET (Q6) and a MOSFET (Q10); the gate of the MOSFET (Q6) is connected to one pin of a resistor (R13) and a TX_FAULT pin of the second electrical interface (J2) respectively; the gate of the MOSFET (Q10) is connected to one pin of a resistor (R15) and a RX_LOS (Receiver Lost of Signal) pin of the second electrical interface (J2) respectively; the drain of the MOSFET (Q6) and the drain of the MOSFET (Q10) are connected to one pin of the resistor (R14) and an INTL (Interrupt) pin of the first electrical interface (J1); the other pin of the resistor (R13), the other pin of the resistor (R14) and the other pin of the resistor (R15) are connected to 3.3V voltage and one pin of a capacitor (C5); the other pin of the capacitor (C5) is connected to ground; the source of the MOSFET (Q6) and the source of the MOSFET (Q10) are connected to ground.

7. The converter according to claim 1, wherein by defining contents of high 128 bytes of PAGE00 of EEPROM in the converter MCU, the contents of high 128 bytes of PAGE00 of the converter has higher priority than the same contents of high 128 bytes of PAGE00 of the optical module; by reading information of the EEPROM inside the converter, the contents of the high 128 bytes of the PAGE00 can be read, no matter whether the converter has been inserted into the optical module or not, so that the contents of high 128 bytes PAGE00 can identify a series of information, including the converter type, SN-number and manufacturer;
when the converter is working with one pin of the converter connected to the optical module and the other pin connected to the switch, the MCU of the converter downloads information of other areas of the optical module to local area, and reads information of other areas of the module from the switch; and
when the optical module is pulled out from the converter, the contents of high 128 bytes of PAGE00 are cleared completely.

8. The converter according to claim 1, wherein the MCU module uses a chip of model EFM8LB; the $24^{th}$ pin of the MCU module is connected to one pin of a resistor (R7) and the SDA pin of the first electrical interface (J1); the other pin of the resistor (R7) is connected to 3.3V voltage; the $23^{rd}$ pin of the MCU module is connected to one pin of resistor (R10) and the SCL pin of the first electrical interface (J1); the other pin of the resistor (R10) is connected to 3.3V voltage; the $16^{th}$ pin of the MCU module is connected to one pin of a resistor (R22) and the SDA pin of the second electrical interface (J2); the other pin of the resistor (R22) is connected to 3.3V voltage; the $13^{th}$ pin of the MCU module is connected to one pin of a resistor (R23) and the SCL pin of the second electrical interface (J2); the other pin of the resistor (R23) is connected to 3.3V voltage; the $22^{nd}$ pin of the MCU module is connected to one pin of the resistor (R11) and the MODSELL pin of the first electrical interface (J1); the other pin of the resistor (R11) is connected to 3.3V voltage; the $18^{th}$ pin of the MCU module is connected to one end pin of the resistor (R21) and the Mod_ABS pin of the second electrical interface (J2); the other pin of resistor (R21) is connected to 3.3V voltage; the $5^{th}$ pin of the MCU module is connected to the RESET pin of the first electrical interface (J1).

\* \* \* \* \*